(12) United States Patent
Kappelman

(10) Patent No.: US 11,800,833 B2
(45) Date of Patent: Oct. 31, 2023

(54) BUILD-UP RESISTANT CROP CONVEYOR SYSTEMS FOR AGRICULTURAL MACHINES

(71) Applicant: Deere & Company, Moline, IL (US)

(72) Inventor: Jacob D. Kappelman, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 912 days.

(21) Appl. No.: 16/527,482

(22) Filed: Jul. 31, 2019

(65) Prior Publication Data

US 2021/0029884 A1   Feb. 4, 2021

(51) Int. Cl.
*A01F 15/07*   (2006.01)
*A01F 15/18*   (2006.01)

(52) U.S. Cl.
CPC .............. *A01F 15/07* (2013.01); *A01F 15/18* (2013.01); *A01F 2015/077* (2013.01); *A01F 2015/183* (2013.01)

(58) Field of Classification Search
CPC ...... A01F 15/07; A01F 15/18; A01F 15/0715; A01F 2015/077; A01F 2015/183
See application file for complete search history.

(56) References Cited

U.S. PATENT DOCUMENTS

| | | | |
|---|---|---|---|
| 3,964,246 A | 6/1976 | Kopaska | |
| 4,969,315 A * | 11/1990 | Ardueser | ............ A01F 15/0715 53/389.5 |
| 5,284,457 A * | 2/1994 | Gerstenberger | ........ F16H 55/36 474/190 |
| 8,656,832 B2 | 2/2014 | Marques et al. | |
| 9,078,399 B2 | 7/2015 | Hubach et al. | |
| 2005/0109007 A1 | 5/2005 | Hood et al. | |

(Continued)

FOREIGN PATENT DOCUMENTS

| EP | 1142469 A2 | 10/2001 |
|---|---|---|
| EP | 3366109 A1 | 8/2018 |

OTHER PUBLICATIONS

European Search Report issued in counterpart application No. 20186905.4 dated Jan. 11, 2021 (07 pages).

*Primary Examiner* — Matthew Katcoff
*Assistant Examiner* — Mohammed S. Alawadi
(74) *Attorney, Agent, or Firm* — KLINTWORTH & ROZENBLAT IP LLP

(57) ABSTRACT

Crop conveyor systems having an enhanced resistance to crop material build-up and suitable for usage in agricultural machines, such as round balers, include a conveyor belt run extending along a primary direction of belt travel, as well as a runner assembly adjacent the conveyor belt run. The runner assembly includes, in turn, elongated runners extending substantially parallel to the primary direction of belt travel and spaced along a lateral axis perpendicular to the primary direction of belt travel. Belt guide surfaces are provided on the elongated runners and face the conveyor belt run. The belt guide surfaces have convex surface regions in a first section plane parallel to the lateral axis and perpendicular to the primary direction of belt travel. The convex surface regions increase conformity between the belt guide surfaces and the conveyor belt run to reduce crop build-up on the elongated runners during usage of the build-up resistant crop conveyor system.

18 Claims, 7 Drawing Sheets

(56) References Cited

U.S. PATENT DOCUMENTS

2015/0075130 A1\* 3/2015 Ryz ........................ A01F 15/18
 56/341
2017/0000035 A1 1/2017 Behrens et al.

\* cited by examiner

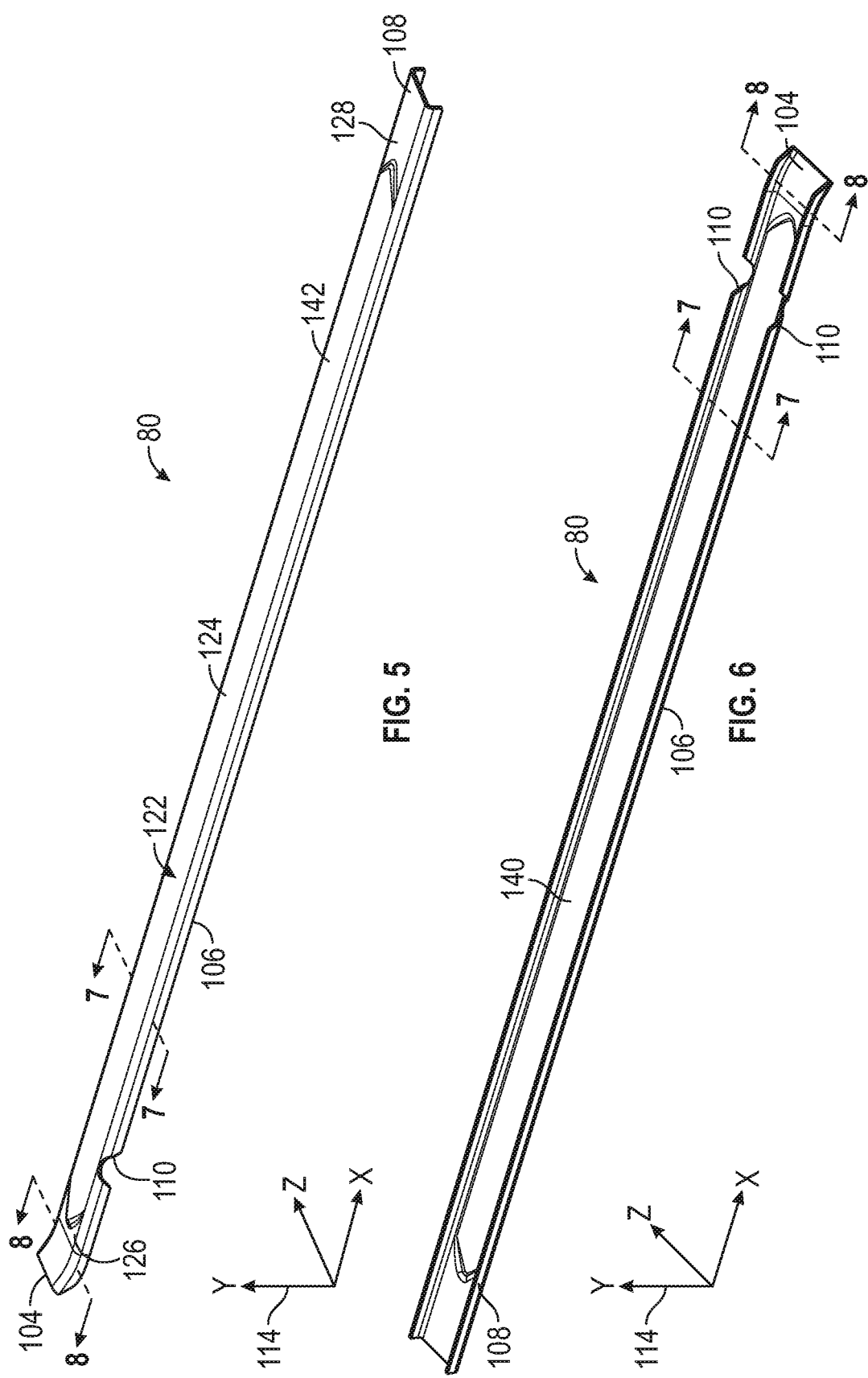

BUILD-UP RESISTANT CROP CONVEYOR SYSTEMS FOR AGRICULTURAL MACHINES

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to crop conveyor systems, which have enhanced resistances to crop material build-up and which are suitable for usage in round balers and other agricultural machines.

BACKGROUND OF THE DISCLOSURE

Crop conveyor systems are commonly integrated into agricultural machines for moving crop material in an intended manner. As a first example, crop conveyor systems are incorporated the baling chambers of round balers to roll crop material into cylindrical or round bales, which are then wrapped and ejected from the baler. As a second example, windrowers (also referred to as "swathers") typically include crop conveyor systems for consolidating crop material into windrows as the windrower travels over a field. As a still further example, combines (also referred to as "agricultural harvesters") may be equipped with certain header attachments, such as draper heads, containing crop conveyor systems for gathering severed crop plants into the feederhouse of the combine for processing. Regardless of the type of agricultural machine into which a particular crop conveyor system is integrated, it is generally desirable for the crop conveyor system to function in an efficient, low friction, reliable manner over extended periods of operation and across a wide range of crop conditions.

SUMMARY OF THE DISCLOSURE

Crop conveyor systems having an enhanced resistance to crop material build-up and suitable for usage in agricultural machines, such as round balers, are provided. In various embodiments, the build-up resistant crop conveyor system includes a conveyor belt run extending along a primary direction of belt travel, as well as a runner assembly adjacent the conveyor belt run. The runner assembly includes, in turn, elongated runners extending substantially parallel to the primary direction of belt travel and spaced along a lateral axis perpendicular to the primary direction of belt travel. Belt guide surfaces are provided on the elongated runners and face the conveyor belt run. The belt guide surfaces have convex surface regions in a first section plane parallel to the lateral axis and perpendicular to the primary direction of belt travel. The convex surface regions increase conformity between the belt guide surfaces and the conveyor belt run to reduce crop build-up on the elongated runners during usage of the build-up resistant crop conveyor system.

In further embodiments, the build-up resistant crop conveyor includes a conveyor belt run extending in a primary direction of belt travel and a first elongated runner adjacent the conveyor belt run. The first elongated runner has a longitudinal axis extending substantially parallel to the primary direction of belt travel. The first elongated runner further includes a first end portion, a second end portion opposite the first end portion, and an intermediate portion between the first and second end portions. A belt guide surface extends from the first end portion, across the intermediate portion, and to the second end portion. A raised protrusion is formed in the intermediate portion and extends toward the conveyor belt run. The raised protrusion is shaped or contoured to increase conformity between the belt guide surface and the conveyor belt run such that crop build-up on the elongated runner is reduced during usage of the build-up resistant crop conveyor system.

In still further embodiments, the build-up resistant crop conveyor system contains a conveyor belt run extending along a primary direction of belt travel. The conveyor belt run includes a plurality of conveyor belts having runner-facing surfaces thereon. The runner-facing surfaces of the conveyor belts have concave surface geometries principally defined by radius of belt curvature in a first section plane orthogonal to the primary direction of belt travel. The build-up resistant crop conveyor system further includes elongated runners extending adjacent and substantially parallel to the plurality of conveyor belts. The elongated runners include belt guide surfaces having convex surface regions defined by a radius of runner curvature in the first section plane. The convex surface regions of the belt guide surfaces are contoured such that radius of runner curvature substantially matches the radius of belt curvature.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures:

FIGS. 5 and 6 are top and bottom isometric views, respectively, of one of the elongated runners included in the runner assembly shown in FIGS. 1-4;

Figure 1:
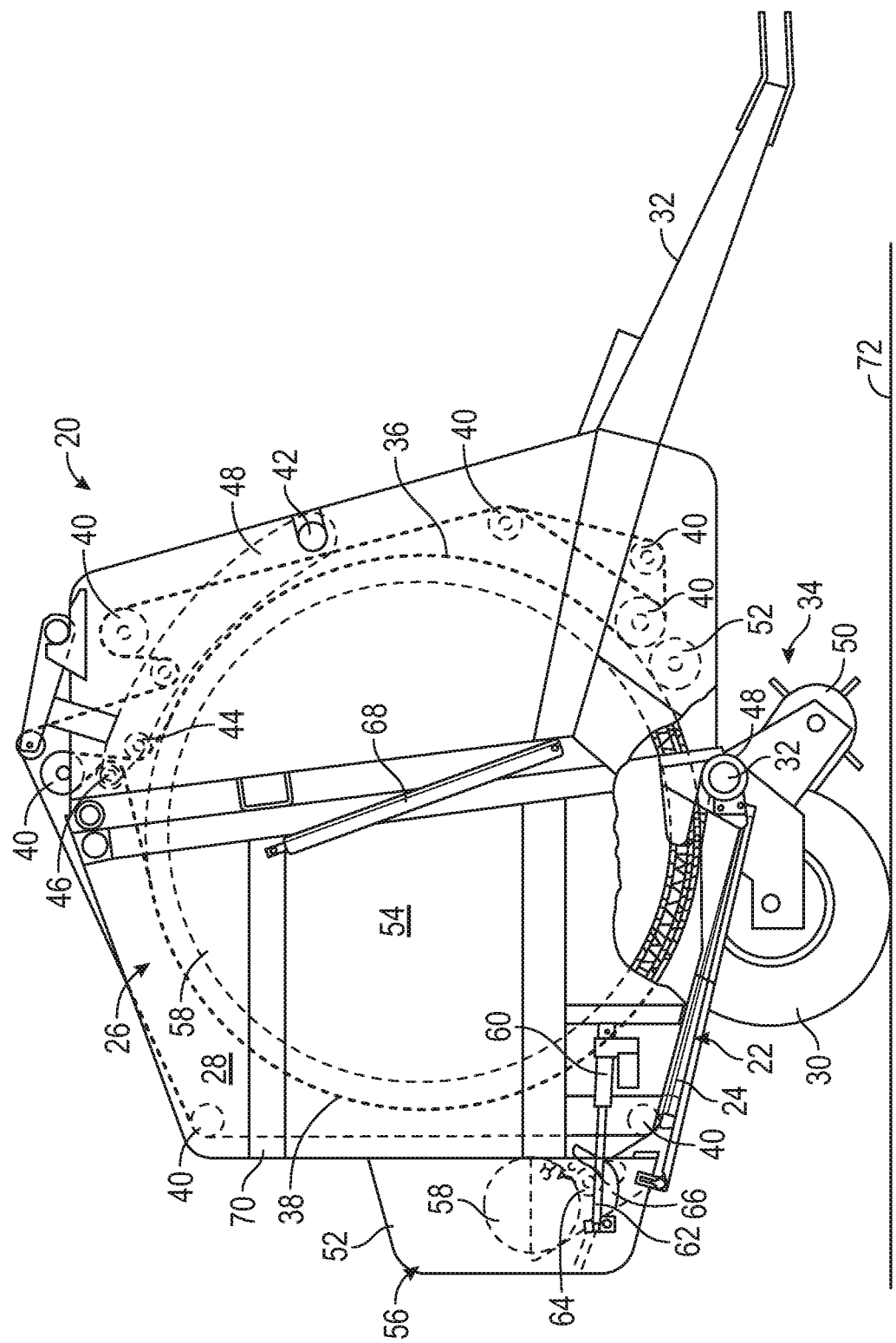
FIG. 1 is a schematic of an agricultural machine (here, a round baler) including a build-up resistant crop conveyor system, as illustrated in accordance with an example embodiment of the present disclosure.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

Overview

As indicated above, various types of crop-handling agricultural machines contain crop conveyor systems for moving crop material in an intended manner. For example, and depending upon implementation, a crop conveyor system may move crop material in a manner consolidating newly-harvested crop plants for processing (as in the case of a draper header for a combine), rolling the crop material into a cylindrical bale (as in the case of a round baler), forming the crop material into windrow (as in the case of a windrower or swather), or to otherwise transporting material from one location to another within an agricultural machine. A given crop conveyor system may include one or more belt runs, with each belt run including a single conveyor belt or a plurality of conveyor belts arranged in a side-by-side relationship.

To help support and guide the conveyor belt run(s), certain crop conveyor systems further include guide structures resembling slatted panels and referred to herein as "runner assemblies." Generally, a runner assembly includes a number of elongated support members or "runners," which are spaced along lateral axis of the runner assembly and which extend parallel to the primary direction of belt travel; that is, the direction in which the conveyor surfaces of a guided belt run principally move when passing adjacent the runner assembly. The elongated runners have belt guide surfaces, which face the conveyor belt run and which may continually or intermittently contact the belt run during operation of the crop conveyor system. The belt guide surfaces of the elongated runners are conventionally imparted with flat surface geometries and highly smooth surface finish to reduce friction between the runners and the conveyor belt run, particularly when the conveyor belt run rotates at relatively high belt speeds.

While providing low friction operation over an initial period of usage, conventional runner assemblies often fail to maintain low friction operation over extended periods of usage. In many instances, this is due to the gradual build-up or accumulation of crop material on certain regions of the elongated runners. Specifically, loose crop material may adhere to the belt guide surfaces of the runners; and, over time, increase in volume, harden due to packing, and become difficult to dislodge. Deposition or build-up of crop materials on the runners typically increases when moving crop materials having relatively high moisture contents and adhesion propensities; e.g., as may be the case during silage conditions. Such hardened crop material deposits are referred to herein as "on-runner crop deposits." When sufficiently severe, on-runner crop deposits may materially detract from the reliability and overall performance levels of the crop conveyor system. Specifically, on-runner crop deposits are often characterized by high surface roughnesses, thereby causing undesirably high levels of friction when contacting the rapidly rotating conveyor belt(s) contained in the conveyor belt run. This, in turn, results in the generation of high levels of waste heat, shortens the service life of the belt run, and may otherwise detract from the performance of the crop conveyor system.

Overcoming the above-noted limitations or technical challenges, the following provides crop conveyor systems characterized by enhanced resistances to the formation of on-runner crop deposits. The enhanced resistance to the formation of on-runner crop deposits is realized, at least in part, through a unique and strategic contouring or shaping of the belt guide surfaces of the runner assembly. Specifically, targeted regions the belt guide surfaces are imparted with non-planar (e.g., convex) surface geometries to increase physical conformance with the conveyor belt or belts contained in the conveyor belt run guided by the crop conveyor system. Such contouring of the belt guide surfaces minimizes gaps in which loose crop material is otherwise prone to deposit at the interface between the belt guide surfaces of the elongated runners and the conveyor belt(s) of the belt run, while maintaining a close proximity relationship between the runners and the conveyor belt run over the entirety or substantial entirety of the runner length. The likelihood of crop material adhesion onto the runners and the formation of on-runner crop deposits is decreased as result. Further, should crop material temporarily adhere to the belt guide surfaces of the runners, the belt run is more likely to remove such drop deposits by abrasion at an early stage prior to further packing and hardening of the deposit. In this manner, low friction operation can be better maintained between the belt run and the runner assembly to prolong belt life, to reduce friction-generated heat, and to otherwise optimize crop conveyor system performance.

While selected regions of the elongated runners are imparted with convex surface geometries in embodiments, as taken across the runner widths, such surface convex geometries may not and often will not extend the entire length of the elongated runners. Instead, in at least some instances, the belt guide surfaces of the elongated runners are usefully further imparted with non-convex (e.g., substantially flat or planar) surface geometries in selected regions of the runners. Thus, in such instances, the belt guide surfaces of the elongated runners are effectively imparted with variable surface geometries that transition or change when moving along runner length. For example, when moving along the runner lengths, the belt guide surfaces may transition from substantially flat or planar surface geometries at first terminal end portions of the elongated runners, to convex surface geometries in intermediate sections of the runners, and perhaps return to substantially flat or planar surface geometries at second terminal end portions of the runners. Additionally or alternatively, the belt guide surfaces of the runners may transition from convex surface geometries to other non-convex (e.g., flat) surface geometries in selected regions corresponding to roller-facing regions of the belt guide surfaces and/or in regions of the runners joined to connecting structures (e.g., cross-support members) also included in the runner assembly.

An embodiment of a build-up resistant crop conveyor system will now be described by way of non-limiting example. In the example embodiment below, the build-up resistant crop conveyor system is described as integrated into a particular type of crop-handling agricultural machine, namely, a round baler. The following example notwithstanding, it is emphasized that embodiments of the build-up resistant crop conveyor system can be integrated into various other types of crop-handling agricultural machines including, but not limited to, windrowers and conveyor belt-containing header attachments (e.g., draper heads) for agricultural combines.

Example Embodiment of Round Baler Including Build-Up Resistant Crop Conveyor System FIG. 1 schematically depicts an example round baler 20 containing a build-up resistant crop conveyor system 22, as illustrated in accordance with an example embodiment. The build-up resistant crop conveyor system 22 includes a runner assembly 24 and certain other components, such as a conveyor belt run; the term "conveyor belt run," as appearing herein, referring to conveyor belt or a series of parallel conveyor belts for moving crop material in an intended manner during conveyor belt rotation. The example build-up resistant crop conveyor system 22 is further described below in connection with FIGS. 2-9. First, however, various other components of the illustrated round baler 20 are discussed to provide a non-limiting context in which the example embodiment of the build-up resistant crop conveyor system 22 may be better understood.

In addition to the build-up resistant crop conveyor system 22, the round baler 20 includes a main frame or baler housing 26 containing a baling chamber 28 in which cylindrical bales are formed as the round baler 20 is towed or otherwise moved across a crop field. The round baler 20 is equipped with a pair of ground wheels 30 and a tongue 32, which facilitates towing of the baler 20 behind a tractor or similar work vehicle. In the illustrated example, the round baler 20 is mechanically powered by the work vehicle utilized to tow the baler 20. In particular, the round baler 20 may be mechanically driven by the engine of a work vehicle through a non-illustrated power take-off (PTO) shaft, which is connected to a corresponding shaft or coupling when the round baler 20 is mated to the work vehicle. In other implementations, the round baler 20 may be independently powered.

As further schematically depicted in FIG. 1, a system of bale-forming belts 36, 38 is located within the baler housing 26 and positioned about the baling chamber 28 of the baler 20. The bale-forming belts 36, 38 include a number of belt runs (e.g., front and rear belt runs), which are supported by multiple rotatable shafts or rollers 40 mounted traversely across opposing sidewalls of the baler housing 26. Tensioning arms 42 tension the bale-forming belts 36, 38 around crop bales as such bales are formed within the baling chamber 28. Front and rear idler rolls 44, 46 further cooperate with the belt runs and the tensioning arms 42 to impart the baling chamber 28 with a variable volume, which adjusts in relation to the size or diameter of the crop bales formed in chamber 28. The round baler 20 may include various other non-illustrated components to further tension the bale-forming belts 36, 38 in embodiments, such as any number of tensioning springs, hydraulic cylinders, or the like.

As the round baler 20 is towed across a field, a crop intake assembly 34 gathers crop material, such as a cut hay or another cereal grain, into the baling chamber 28. To enable delivery of the collected crop material into the baling chamber 28, a crop intake opening 48 is provided adjacent a bottom portion of the baling chamber 28. A pickup 50 intakes the crop material into the crop intake opening 48. A starter roll 52, mounted traversely within the baler housing 26 proximate the crop intake opening 48, facilitates bale formation by stripping crop material carried downwardly by the front run of the belt system 36, 38. The ingested crop material is then rolled into a cylindrical shape or "round bale" within the baling chamber 28 by a turning or tumbling motion induced by rotation of the bale-forming belts 36, 38. An example of a newly-produced crop bale 54, as formed by the rolling motion of the bale-forming belts 36, 38, is shown in phantom FIG. 1.

After the crop bale 54 has reached a desired size, a wrap material supply system 56 is activated to wrap or wind the newly-formed crop bale 54 with a length of wrap material, such as a relatively thin mesh or netting. A non-illustrated controller may determine when the crop bale 54 has reached its desired size utilizing sensor data indicative of, for example, current bale diameter and drive roll speed. When activated, the wrap material supply system 56 feeds wrap material drawn from a wrap material roll 58 into the baling chamber 28. More specifically, the controller may initiate wrapping of the crop bale 54 by commanding a linear actuator 60 to extend an output shaft 62, as shown in its retracted state in FIG. 1. Extension of the actuator output shaft 62 places the wrap material roll 58 in engagement with a spinning feed roll 64, which may have a tacky (e.g., rubberized) outer surface, thereby drawing material from the wrap material roll 58. Extension of the output shaft 62 also rotates a counter-knife arm 66 in a first rotational direction (counter-clockwise in the orientation shown in FIG. 1). Further rotation of the crop bale 54 within the baling chamber 28, as induced by the action of the bale-forming belts 36, 38, then applies the wrap material about the outer periphery of the crop bale 54.

After application of a sufficient length of wrap material about the periphery of the crop bale 54, the wrap material drawn from the wrap material roll 58 is severed by the wrap material supply system 56. To accomplish this, the linear actuator 60 is commanded to retract output shaft 62 in a manner terminating feeding of material from the wrap material roll 58, while further rotating the counter-knife arm 66 in an opposing rotational direction (clockwise in the illustrated orientation). The rotating counter-knife arm 66 pinches the wrap material between a cutting edge of the counter-knife arm 66 and a non-illustrated stationary edge or "counter-knife angle" further included in the wrap material supply system 56. This severs the drawn wrap material at a location between the newly-wrapped crop bale 54 and the wrap material roll 58 held within the wrap material supply system 56. Following cutting of the wrap material, the crop bale 54 is then ejected from the baling chamber 28. In particular, a pair of gate cylinders 68 (one of which can be seen in FIG. 1) are extended in manner swinging an aft hatch or baler gate frame 70 upwardly into an open position. The wrapped crop bale 54 is then discharged from the baling chamber 28 and onto the ground 72 for subsequent retrieval.

Figure 2:
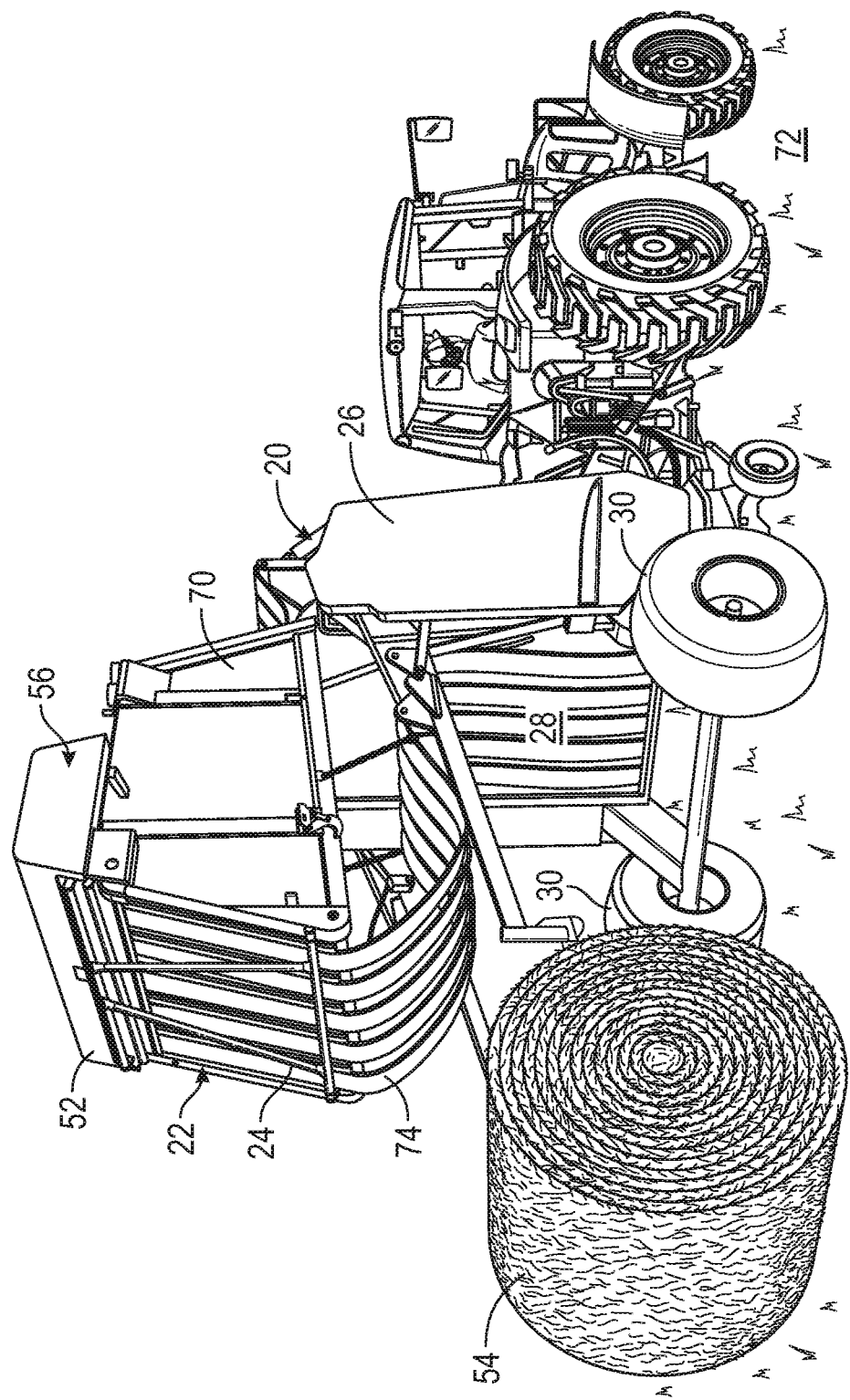
FIG. 2 is a rear perspective view of the round baler shown in FIG. 1, as depicted when ejecting a round bale to more clearly reveal a runner assembly suitably included in the example build-up resistant crop conveyor system.

FIG. 2 provides a perspective view of the example round baler 20 when ejecting the newly-wrapped crop bale 54 from the baling chamber 28, as previously described. With the baler gate frame 70 rotated into an open or upright position for bale ejection, the build-up resistant crop conveyor system 22 and the runner assembly 24 are more clearly revealed. Here, it can be seen that the runner assembly 24 supports (that is, serves as a physical guide for) a conveyor belt run 74 containing a series of conveyor belts or bands arranged in a side-by-side relationship. When the baler gate frame 70 is returned to the closed position shown in FIG. 1, the runner assembly 24 is generally located beneath the baling chamber 28 such that the weight of the conveyor belt runs 36, 38 urges the belt run 74 against the runners of runner assembly 24.

Figure 3:
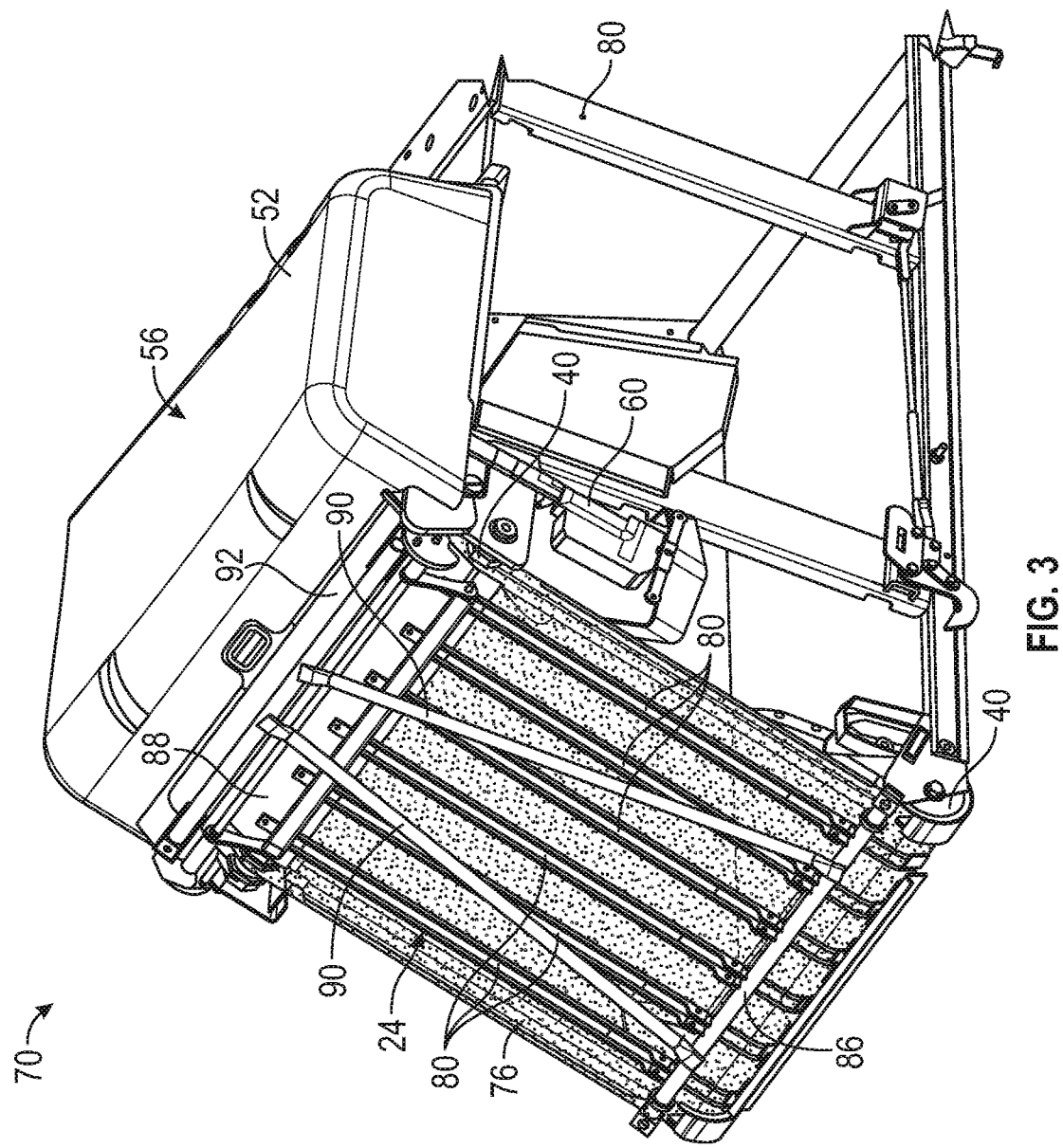
FIG. 3 is an isometric view of the gate frame included in the round baler shown in FIGS. 1 and 2 further illustrating the example runner assembly.

Referring now to FIG. 3, the baler gate frame 70 of the example round baler 20 (FIGS. 1 and 2) is shown in isolation with a near side of the gate frame 70 hidden from view. In this drawing figure, the baler gate frame 70 is shown in its open, bale-ejection position corresponding to the position shown in FIG. 2. A length of wrap material 76 is further shown as drawn from the wrap material roll 58, which is contained within a housing or cover piece 78 of the supply system 56 and thus hidden from view in FIG. 3. The drawn wrap material 76 is located inboard of or interior to the runner assembly 24. Stated differently, the drawn wrap material 76 is located closer to the baling chamber 28 of the round baler 20 than is the runner assembly 24, considered when the baler gate frame 70 resides in the closed position (FIG. 1). Although not shown in FIG. 3, the belt run 74 is further located to the interior of the drawn wrap material 76 such that the wrap material 76 is guided between the runner assembly 24 and the belt run 74 when delivered into the baling chamber 28 by the wrap material supply system 56.

Figure 4:
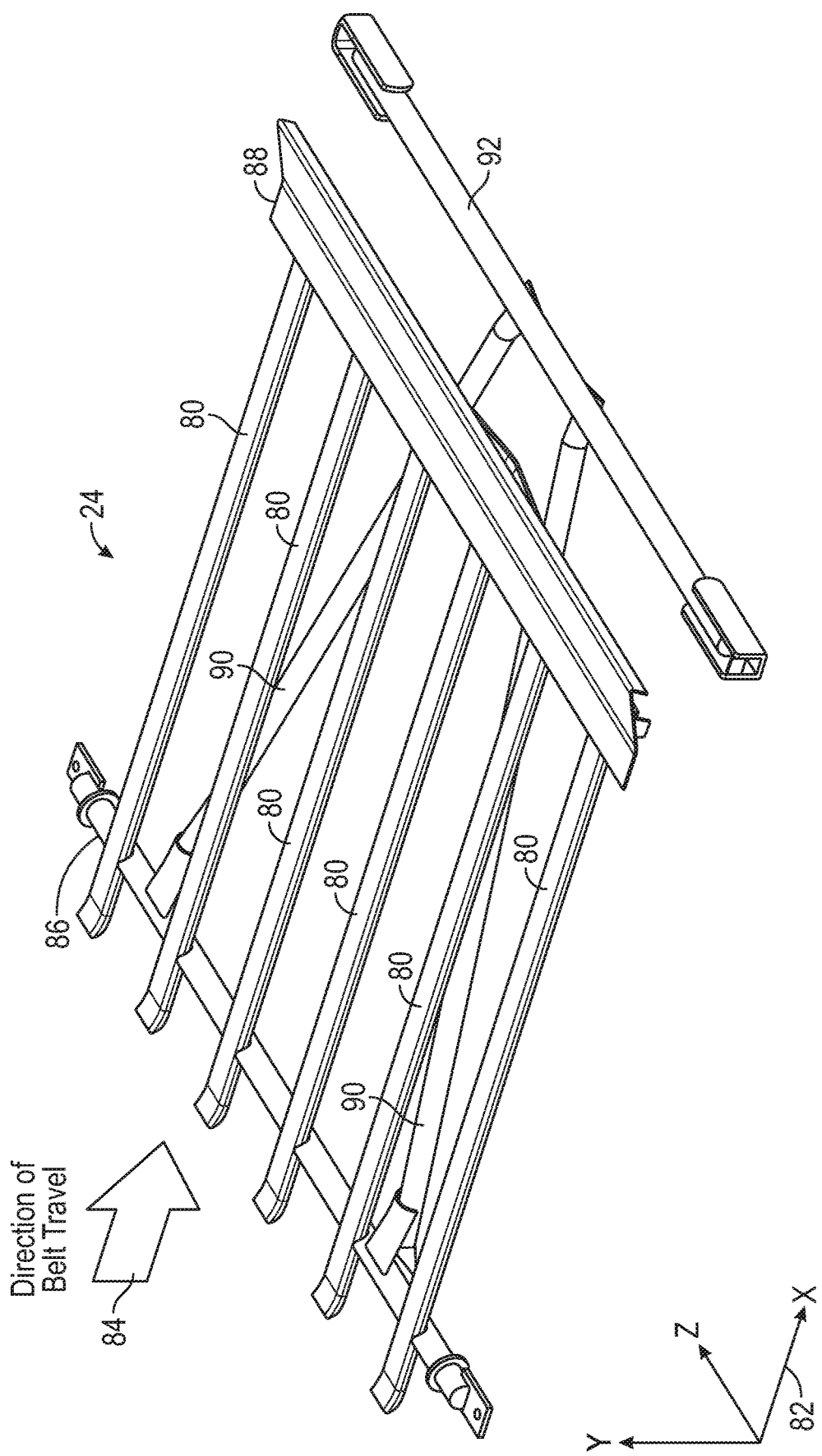
FIG. 4 is an isometric view of the example runner assembly of FIGS. 1-3 shown in isolation.

Referring also now to FIG. 4, the example runner assembly 24 contains a plurality of elongated beams, support members, or runners 80. In the illustrated embodiment, the runner assembly 24 contains a total of six elongated runners 80, which are spaced at regular intervals along a lateral axis of the runner assembly 24 (extending parallel to the Z-axis of the coordinate legend 82 appearing in FIG. 4). In alternative implementations, the runner assembly 24 can include a greater or lesser number of runners 80, which may be arranged in other spatial configurations. The runners 80 are elongated along their longitudinal axes, which generally extend from the left to the right in FIG. 4. More particularly, the longitudinal axes of the elongated runners 80 extend parallel to the X-axis of the coordinate legend 82 and parallel to the primary direction of belt travel of the supported belt run 74 (identified by arrow 84). As previously noted, the term "primary direction of belt travel" refers to the principal direction in which the conveyor surfaces of the belt run 74 travel when passing adjacent the runner assembly 24.

In addition to the elongated runners 80, the runner assembly 24 further includes a number of connective structures or cross-support members 86, 88, which across and extend perpendicular to the elongated runners 80. Specifically, the example runner assembly 24 includes a first cross-beam or cross-support member 86, which extends across and is joined to first end portions of the elongated runners 80; and a second cross-beam or cross-support member 88, which extends across and is joined to second, opposing end portions of the runners 80. The runner assembly 24 still further includes a A-frame support 90, 92, which is assembled from two angled beam members 90 and a third cross-support member 92. At a first end thereof, the angled beams 90 are joined to cross-support member 86 (as shown on the left of FIG. 4). At a second, opposing end thereof, the angled beams 90 are joined to cross-support member 92 (as shown on the right of FIG. 4). The A-frame support 90, 92 may further reinforce the example runner assembly 24 when installed in the baler gate frame 70, as best observed in FIGS. 2 and 3. Further, the A-frame support 90, 92 provides a physical standoff between the supported belt run 74 and the exterior of the round baler 20 for increased operator safety.

The particular construction and composition of the elongated runners 80 and cross-support members 86, 88 will vary among embodiments. In embodiments, by way of non-limiting example, the elongated runners 80 are conveniently fabricated from sheet metal, which is rolled and otherwise formed into the appropriate cross-sectional shapes and cut to length. Comparatively, the cross-support member 86 may be formed as a tubular pipe or beam, while the cross-support member 88 may be formed from a flat strip of sheet metal. The joinder between the elongated runners 80 and cross-support members 86, 88 can be formed in various manners, whether utilizing mechanical fasteners, a permanent joinder technique (e.g., welding), or a combination thereof. Further description of the joints formed between the elongated runners 80 and cross-support members 86, 88 is provided below.

As previously discussed, conventional runner assembly designs often fail to maintain low friction operation over extended periods of in-field usage due, at least in part, to the susceptibility of such runner assemblies to the formation of on-runner crop deposits. In accordance with teachings of the present disclosure, it has been determined that the propensity for the formation of on-runner crop deposits stems, at least in principal part, from a lack of physical conformity between the belt guide surfaces of the elongated runners and the conveyor belt(s) of the conveyor belt run in certain localized areas. Further explained, the conveyor belt(s) contained in the belt run inherently have some degree of rigidity, as determined by various factors including the (typically woven) construction of the conveyor belt(s) and force vectors urging the conveyor belt(s) against the elongated runners. The conveyor belt(s) within a given belt run are consequently incapable of precise conformance against the flat or planar runner surfaces along the length of the runners, even when forcibly pressed there against. As a result, a low conformance interface is created between the supported belt run and the elongated runners along certain surface regions thereof; the term "low conformance interface" referring to the degree to which the surface geometry or contour of the runner belt guide surfaces conforms with (matches or follows the shape of) the conveyor belt shape adjacent the belt guide surfaces. Due to such low conformance interfaces, small gaps or voids are permitted to open between the belt guide surfaces of the elongated runners and the conveyor belt run during operation of the crop conveyor system, with such gaps or voids providing unoccupied space within which loose crop material may freely deposit onto the belt guide surfaces of the elongated runners, grow in volume, harden by packing, and form on-runner crop deposits.

Figure 10:
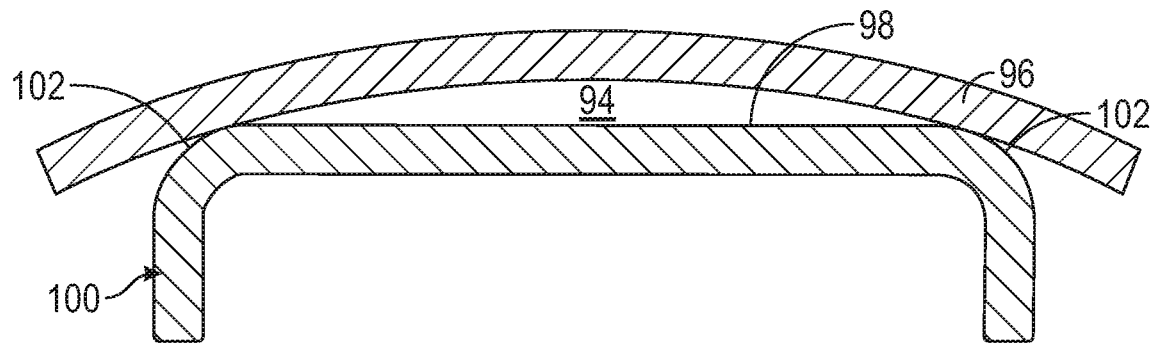
FIG. 10 is a cross-sectional view of a conventional elongated runner and a crop conveyor belt illustrating a low conformity interface between a flat surface region of the runner and a corresponding conveyor belt.

Referring briefly to FIG. 10, a simplified cross-section depicts an example of a gap or void 94 created due to a low conformance interface between the runner-facing surface of a conveyor belt 96 and conventional belt guide surface 98 of an elongated runner 100. The belt guide surface 98 of the runner 100 principally has a non-convex, substantially flat geometry along the length of the elongated runner 100; although the longitudinal corner regions of the runner 100 may have a certain curvature or radii due to the manner in which the runner 100 is rolled or otherwise formed from sheet metal stock. Due to the predominately flat geometry of belt guide surface 98, taken across the width of the runner 100, contact between the conveyor belt 96 and the belt guide surface 98 is generally limited to the corner regions 102 of the elongated runner 100. Further, the formation of the gap 94 provides an unoccupied void, space, or pocket in which loose crop material may adhere to a central portion of the belt guide surface 98 and ultimately form on-runner crop deposits. If such on-runner crop deposits should form and aggregate to a sufficient size, contact may occur between the crop deposit and a central portion of the conveyor belt 96. Contact between the conveyor belt 96 and the on-runner crop deposit (which is often characterized by a highly rough, compacted outer surface) may result in the generation of excessive friction and waste heat, exacerbate belt wear, and otherwise detract from the overall performance of the crop conveyor system.

To overcome the above-described issues associated with conventional runners, at least some, if not all of the elongated runners 80 contained in the example runner assembly 24 are imparted with tailored surface geometries having convex surface regions, which increase physical conformance with the conveyor belt(s) contained in a corresponding belt run. With respect to the example runner assembly 24, specifically, the elongated runners 100 may each include convex surface regions or geometries increasing physical conformance with the conveyor belts included in the belt run 74 identified in FIG. 2. Such convex surface geometries may not extend the entirety of the respective lengths of the elongated runners 100, but rather may be strategically formed in certain regions of the runner guide surfaces, such as those regions of the runners 100 located adjacent portions of the conveyor belts that tend to assume concave shapes, as described below. Concurrently, other surface regions of the elongated runners 100, such as those regions of the runners 100 located adjacent rollers (e.g., the rollers 40 shown in FIG. 3) or joined to a cross-support member (e.g., the cross-support member 88 shown in FIG. 4) may be imparted with non-convex (e.g., substantially flat or planar) surface geometries, which better conform with conveyor belt shape in such regions, as also discussed below.

For ease of description, the following focuses on a single elongated runner 80 included in the example runner assembly 24 having both convex and non-convex (e.g., flat or planar) surface regions. While a single elongated runner 80 is shown and discussed in connection with FIGS. 5-9 below, each of the elongated runners 80 contained in the example runner assembly 24 may have similar, if not identical constructions and surface geometries in the illustrated example; thus, the following description is equally applicable to all of the runners 80 contained in the example runner assembly 24 shown in FIGS. 1-4. This notwithstanding, the elongated runners 80 included in the runner assembly 24 may differ in further embodiments such that each runner 80, or different subsets of runners 80, may be imparted with varying constructions and/or surface geometries in alternative embodiments of the build-up resistant crop conveyor system 22.

Advancing to FIGS. 5 and 6, top and bottom isometric views of the example elongated runner 80 are presented. The elongated runner 80 includes a first end portion 104, an intermediat or "elongated body" portion 106, and a second end portion 108. The first and second end portions 104, 108 are spaced or opposed along the longitudinal axis of the illustrated runner 80, which extends parallel to the X-axis identified by the coordinate legend 114. The boundaries or junctures between the first end portion 104, the intermediate portion 106, and the second end portion 108 are somewhat conceptual; however, the intermediate portion 106 of the elongated runner 80 generally corresponds to the region of the runner 80 in which the below-described protuberance or raised feature is formed. Further, it may be the case that the intermediate portion 106 of the elongated runner 80 has a length at least twice, if not ten times the respective lengths of the end portions 104, 108, as measured along the longitudinal axis of the runner 80 (again, parallel to the X-axis of the coordinate legend 114).

The example runner 80 further includes laterally-opposed sidewalls 112 and notches 110, which are formed in the sidewalls 112 proximate the end portion 104 of the elongated runner 80. The notches 110 facilitate attachment to the cross-support member 86 in embodiments when the cross-support member 86 has a tubular, pipe-like formfactor, as shown in FIG. 4. In other embodiments, the elongated runner 80 may lack the notches 110 and/or have other features (e.g., additional cut-outs) to facilitate attachment to either or both of the cross-support members 86, 88. Further, the end portion 104 of the elongated runner 80 may be imparted with a slight inward bend or curvature (that is, a bend in the direction of the baling chamber 28) to, for example, better follow the curvature of the outer circumferential surface of the lower roller 40 shown in FIG. 3 when the runner assembly 24 is installed in the baler gate frame 70 (FIGS. 1-3).

Collectively referring to FIGS. 5-8, the elongated runner 80 has a thin-walled construction in the illustrated example, with a trench or open channel 116 extending longitudinally along the underside of the runner 80. As previously indicated, the elongated runner 80 includes two sidewalls 112, which are opposed along a lateral axis of the runner 80 (parallel to the Z-axis of the coordinate legend 114). As identified in FIGS. 7 and 8, a main section or front wall 118 extends along the width of the runner 80 between the sidewalls 112 and is joined thereto at laterally-opposed corner regions 120. Facing the belt run 74 (FIG. 2), a belt guide surface 122 is provided exclusively or principally on the exterior of the front wall 118. The belt guide surface 122 may extend onto the corner regions 120 and, perhaps, onto upper portions of the sidewalls 112 depending upon the particular manner in which the corresponding conveyor belt interacts with the elongated runner 80; e.g., whether the guided conveyor belt routinely contacts these areas of the runner 80.

The front wall 118 and the sidewalls 112 of the elongated runner 80 are conveniently, although non-essentially formed as a single piece or integral part. When so formed, the sidewalls 112 of the elongated runner 80 may be integrally joined to opposing longitudinal edges of the front wall 118 in a manner imparting the runner 80 with a substantially U-shaped geometry, as viewed along the longitudinal axis of the runner 80. The U-shaped geometry of the runner 80 opens in the direction opposite the front wall 188 and, more specifically, opposite the belt guide surface 122. In various embodiments, the elongated runner 80 may fabricated by processing sheet metal utilizing any number of known forming techniques, such as rolling to produce the beam-like body of the runner 80. A die pressing or stamping technique may be further utilized to create one or more localized (e.g., raised) features or protrusions to impart certain surface regions of front wall 188 with convex surface geometries, as described below. In still further embodiments, the elongated runner 80 (and the other runners 80 included in the runner assembly 24) can be fabricated in other manners (e.g., by metal extrusion) and/or composed of other materials including composite materials, such as carbon fiber. Further, in certain embodiments, a coating material may be applied over the entirely or selected regions of belt guide surface 122 to, for example, decrease surface friction with the guided conveyor belt. In other embodiments, such a low friction coating may not be applied to belt guide surface 122.

The belt guide surface 122 of the example elongated runner 80 includes a convex surface region 124 and two substantially flat or planar surface regions 126, 128. The convex surface region 124 has a convex surface geometry in a first series of successive section planes extending along the runner length. These section planes are oriented parallel to the lateral axis of the runner assembly 24 and the elongated runner 80 (corresponding to the Z-axis of the coordinate legend 114 in FIGS. 5 and 6), orthogonal to the primary direction of belt travel (identified by arrow 84 in FIG. 4), and orthogonal to the longitudinal axis of the runner 80 (corresponding to the X-axis of the coordinate legend 114). Consider, as an example, the section plane corresponding to the cross-section shown in FIG. 7 and encompassing line 7-7 (FIGS. 5 and 6). As can be seen, the surface region 124 of the elongated runner 80 has a gently curved, convex surface geometry in this section plane. The convex surface region 124 of the example elongated runner 80 has a convex cross-sectional geometry spanning the majority, if not the substantial entirety of the runner width, as measured along the lateral axis of the runner 80 (identified by double-headed arrow 138 in FIG. 9). Additionally, and as best shown in FIG. 5, the convex surface region 124 is formed in intermediate portion 106 of the elongated runner 80 and extends at least a majority of the runner length, as taken along the longitudinal axis of runner 80 (again, corresponding to the X-axis of the coordinate legend 114). More broadly, the belt guide surfaces 122 of some, if not all of the elongated runners 80 may be imparted with similar or identical convex surface regions taken in the section plane of FIG. 7 (when visually extended to intersect all of the runners 80 of the example runner assembly 24).

Figure 7:
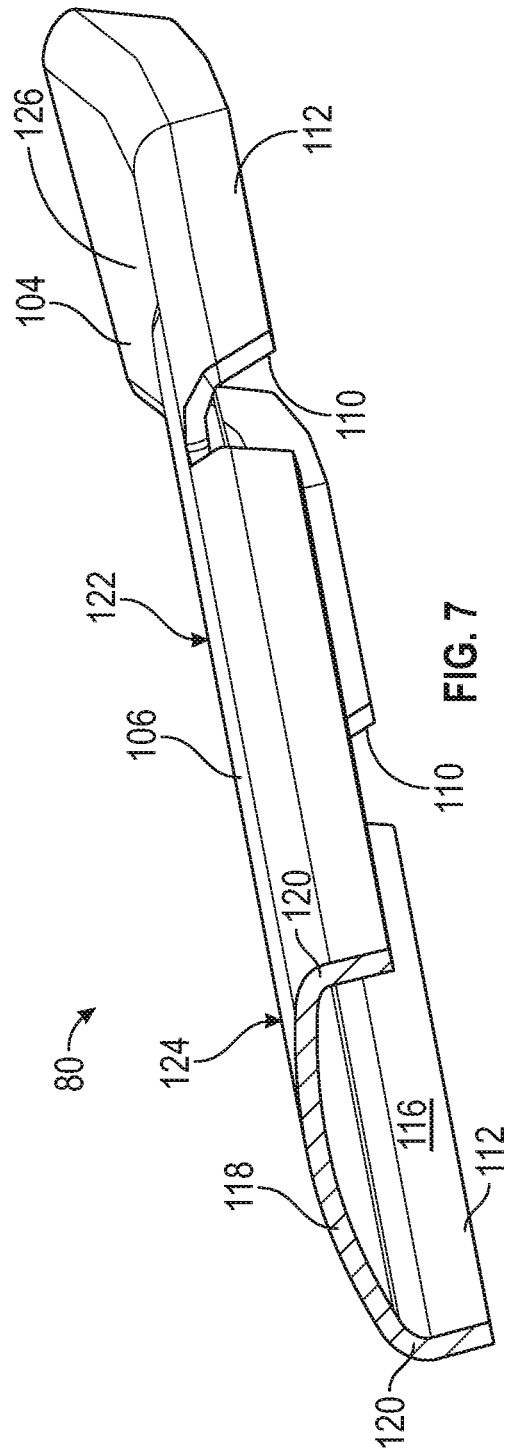
FIG. 7 is an isometric cross-sectional view of the elongated runner shown in FIGS. 5 and 6, as taken along a first section plane encompassing line 7-7 (identified in FIGS. 5 and 6) and depicting the convex cross-sectional surface geometry of a convex surface region of the runner.
Figure 9:
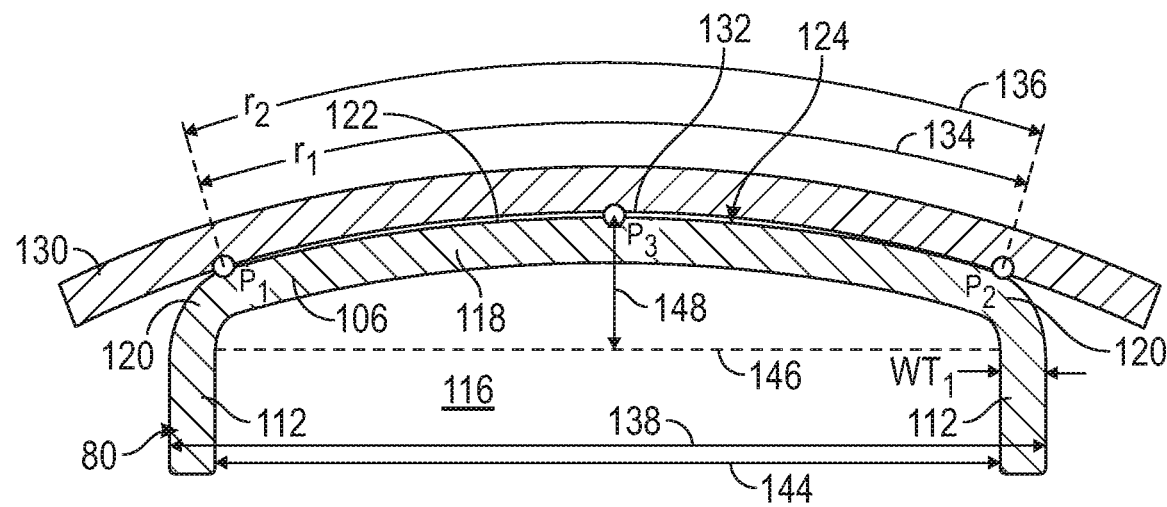
FIG. 9 is a cross-sectional view of the elongated runner shown in FIGS. 5-8 and a crop conveyor belt illustrating a high conformance interface between a convex surface region of the runner and a corresponding conveyor belt.

The surface geometry of the convex surface region 124, and the manner in which this surface geometry substantially matches or follows the adjacent surface contour of a corresponding conveyor belt 130, may be better appreciated by reference to FIG. 9 (corresponding to the cross-section shown in FIG. 7). In this drawing figure, it can be seen that the convex surface region 124 is imparted with a convex contour substantially matching, complementing, or following the concave contour of a runner-facing surface 132 of the conveyor belt 130. The convex surface region 124 of the belt guide surface 122 of the elongated runner 80 is imparted with a curved, non-stepped surface geometry following a first radius of curvature ($r_1$) or "radius of runner curvature" identified by double-headed arrow 134. The radius runner of curvature ($r_1$) of the convex surface region 124 extends from a first outermost contact point ($P_1$) adjacent the left sidewall 112 to a second outermost contact point ($P_2$) adjacent the right sidewall 112. The term "outermost contact point," as appearing herein, refers to a contact point between the belt guide surface 122 and the runner-facing surface 132 located furthest the longitudinal axis or centerline of the runner 80 (corresponding to X-axis of the coordinate legend 114), taken in either direction along the lateral axis of the runner 80 (corresponding to Z-axis of the coordinate legend 114).

In the illustrated cross-section of FIG. 9, the concave, runner-facing surface 132 of the conveyor belt 130 essentially follows a second radius of curvature ($r_2$) or "radius of belt curvature," as taken between the first and second contact points ($P_{1,2}$) and identified by double-headed arrow 136. In various embodiments, the convex surface region 124 of the elongated runner 80 may be contoured or shaped such that the radius runner of curvature ($r_1$) substantially matches or follows the radius of belt curvature ($r_2$); the term "substantially matches," as appearing herein, denoting a disparity of less than 10%. In other embodiments, the radius of runner curvature ($r_1$) may differ from the radius of belt curvature ($r_2$) to a greater extent, providing that the convex surface region 124 is imparted with a convex surface geometry increasing conformity with the runner-facing surface 132 of the conveyor belt 130. In still other embodiments, the radius of runner curvature ($r_1$) of convex surface region 124 may be greater than and, perhaps, may be at least twice the runner width ($W_1$), with the runner width ($W_1$) measured along the lateral axis of runner 80 and identified by double-headed arrow 138 in FIG. 9. In further embodiments, the convex surface region 124 may have more complex cross-sectional surface geometries defined by additional radii of curvature, with the possibility that certain localized surface features or, perhaps, rounded step features approximating a larger curve or multiple curved sections can be formed in the convex surface region 124 of the elongated runner 80.

The convex surface region 124, as considered in the cross-section shown in FIGS. 7 and 9, may further be described as having an apex or peak height. The location of the peak height of the convex surface region 124 in the illustrated cross-section is identified by marker $P_3$ in FIG. 9. In instances in which the convex surface region 124 is bilaterally symmetry about a plane orthogonal to the illustrated cross-sectional plane, the peak height ($P_3$) of the convex surface region 124 may be located equidistantly between the sidewalls 112 of the elongated runner 80. The dimension of the peak height ($P_3$), as measured as a vertical offset from a line connecting the two outer points of contact ($P_1$, $P_2$), will vary among embodiments. However, by way of non-limiting example in which the elongated runner 80 is formed from sheet metal having a specified flatness tolerance (e.g., as set-forth in the material specifications), the peak height ($P_3$) may be at least twice the specified flatness tolerance of the sheet metal from which the runner 80 is produced. Additionally or alternatively, the peak height ($P_3$) may be greater than at least one half the average wall thickness of the elongated runner 80 in embodiments, with a wall thickness of the elongated runner 80 identified in the right side of FIG. 9 and labeled $WT_1$.

The example elongated runner 80 further includes two substantially flat or planar surface regions 126, 128 of the belt guide surface 122, which are formed on the end portions 104, 108 of the runner 80. As a result of this variance in surface topology, the belt guide surface 122 of the elongated runner 80 transitions from a first substantially flat or planar surface geometry to a convex surface geometry when moving from the first end portion 104 to the intermediate portion 106 of the elongated runner 80, as taken along the runner's longitudinal axis (corresponding to the X-axis of the coordinate legend 114). Similarly, the belt guide surface 122 of the runner 80 further transitions from the convex surface geometry within convex surface region 124 to a second substantially flat or planar surface geometry when moving from the intermediate portion 106 to the second end portion 108 of the elongated runner 80, as further taken along the runner's longitudinal axis. Such transitions between convex and flat (or other non-convex) surface geometries ideally follow a gently ramped, non-stepped contour to provide a gradual change in surface topology to ease the transition of the guided conveyor belt 130 when guided over these regions of the elongated runner 80. In other implementations, the belt guide surface 122 of the elongated runner 80 may be more complex and, perhaps, include a greater number of localized convex surface regions interspersed with a greater number of non-convex (e.g., flat) surface regions along the runner length.

As further shown in FIG. 9, a double-headed arrow 144 represents an inner width of the runner (here, measured between the inwardly-facing surfaces of the sidewalls 144). A line 146 extends parallel to the lateral axis of the runner 80 and through the corner or bend regions 120 of the runner 80; e.g., in embodiments, the line 146 may connect two interior points at which the runner's curvature begins or, instead, two points of maximum curvature or bend radii on the interior of the runner 80. Finally, the dimension $H_{PEAK}$ represents a peak height of the convex surface region 124 of the runner 80, as measured from the line 146 along an axis orthogonal to the lateral and longitudinal axes of the runner (represented by a double-headed arrow 148). In various embodiments, the convex surface region 124 of the runner 80 is shaped such that $H_{PEAK}$ ranges from about 3% to about 25% of the convex surface region 124 of the runner 80 (dimension 144 in FIG. 9) in the illustrated section plane. In other embodiments, the convex surface of the runner 80 may be shaped such that $H_{PEAK}$ is greater than or less than the aforementioned range.

Figure 8:
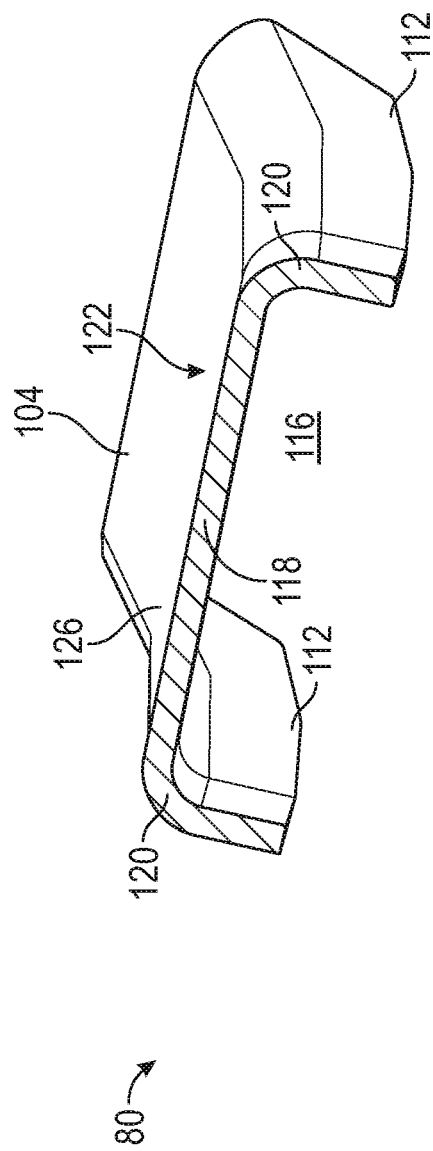
FIG. 8 is an isometric cross-sectional view of the elongated runner shown in FIGS. 5 and 6, as taken along a second section plane encompassing line 8-8 (identified in FIGS. 5 and 6), depicting the substantially flat cross-sectional surface geometry of a non-convex surface region of the runner.

FIG. 8 is a simplified cross-section view of the end portion 104 of the elongated runner 80 along a section plane containing line 8-8 (FIGS. 6 and 7) and extending parallel to the section plane of FIGS. 7 and 9. The geometry of the belt guide surface 122 in this cross-section plane is predominately defined by, or closely follows, a plane extending parallel to the longitudinal and lateral axes of the runner 80. Imparting the belt guide surface 122 with such a flat planar geometry at the end portion 104 is beneficial in that the end portion 104 of the runner 80 is positioned adjacent lower roller 40 (FIG. 3) when the runner assembly 24 is installed with the baler gate frame 70. In this region, the runner-facing surface 132 of the conveyor belt 130 assumes an increasingly flat or non-concave shape due to the physical interaction of the conveyor belt 130 with the corresponding roller 40. By imparting the end portion 104 of the runner 80 with such a flat surface geometry, a high conformance interface is maintained in this region of the belt guide surface 122 with the runner-facing surface 132 of the conveyor belt 130, with such a high conformance interface preserved to a greater extent than would otherwise be achieved if the convex surface geometry of the intermediate portion 106 of the elongated runner 80 were to extend fully to the end portion 104 of the runner 80. In a broader sense, and similar to the cross-sectional geometry shown in FIGS. 7 and 9, the belt guide surfaces 122 of some, if not all of the elongated runners 80 may be imparted with similar or identical flat surface regions in the section plane of FIG. 8 (when visually extended to intersect all of the runners 80 of the example runner assembly 24 and again noting that this section plane is parallel to the section plane of FIGS. 7 and 9).

The end portion 108 of the example elongated runner 80 is likewise imparted with a substantially flat or planar surface geometry substantially identical to that shown in FIG. 8. The previous description set-forth in connection with FIG. 8 pertaining to the substantially flat surface geometry of the end portion 104 is thus equally applicable to the surface geometry of the opposing end portion 102 of the elongated runner 80. Once again, by imparting the end portion 108 of the runner 80 with a flat surface geometry, conveyor belt conformity is increased in a region adjacent a conveyor belt-supporting roller; i.e., the upper roller 40 shown in FIG. 3. Further, as an additional benefit, imparting the end portion 108 of the elongated runner 80 with such a flat or substantially planar surface geometry eases or helps simplify the joiner interface with the cross-support member 88. In particular, such a flat surface geometry enables the elongated runner 80 (and the other runners 80 included in the runner assembly 24) to positioned flat or flush against the adjacent flat wall of the cross-support member 88, as shown in FIG. 4.

The particular manner in which selected region(s) of the belt guide surface 122 are imparted with a convex surface geometry will vary among embodiments depending, in part, upon the manner in which elongated runner 80 is fabricated. In the illustrated example in which the elongated runner 80 is produced by rolling or otherwise forming sheet metal into a desired shape, the intermediate portion 106 of the elongated runner 80 may be imparted with a convex surface geometry utilizing a stamping or die pressing technique. In particular, prior to or following forming of a metal sheet into the general, beam-like shape of the elongated runner 90, a raised protrusion 142 (FIG. 5) may be pressed or stamped the front wall 118 of the runner 80 from the backside thereof. A suitable press die or other tool may be utilized for this purpose. This results in the formation of an elongated, sloped ridge or raised protrusion 142, which extends longitudinally along the length of the intermediate portion 106 of the elongated runner 80, as best shown in FIG. 5. Concurrently, a concavity 140 is formed in the backside of the front wall 118 of the runner 80 as viewed from the underside of the runner 80 and as best shown in FIG. 6.

Enumerated Examples of the Build-Up Resistant Crop Conveyor Systems

The following examples of the build-up resistant crop conveyor system are further provided and numbered for ease of reference.

1. A build-up resistant crop conveyor system utilized within an agricultural machine is provided. In various embodiments, the build-up resistant crop conveyor includes a conveyor belt run extending along a primary direction of belt travel, as well as a runner assembly adjacent the conveyor belt run. The runner assembly includes, in turn, elongated runners extending substantially parallel to the primary direction of belt travel and spaced along a lateral axis perpendicular to the primary direction of belt travel. Belt guide surfaces are provided on the elongated runners and face the conveyor belt run. The belt guide surfaces have convex surface regions in a first section plane parallel to the lateral axis and perpendicular to the primary direction of belt travel. The convex surface regions increase conformity between the belt guide surfaces and the conveyor belt run to reduce crop build-up on the elongated runners during usage of the build-up resistant crop conveyor system.

2. The build-up resistant crop conveyor system of example 1, further including a roller supporting the conveyor belt run and extending parallel to the lateral axis. The belt guide surfaces further include non-convex surface regions adjacent the roller.

3. The build-up resistant crop conveyor system of example 2, wherein the non-convex surface regions have substantially flat surface geometries in a second section plane parallel to the first section plane.

4. The build-up resistant crop conveyor system of example 1, wherein the convex surface regions each have a surface geometry defined, at least in substantial part, by a radius of curvature in the first section plane.

5. The build-up resistant crop conveyor system of example 4, wherein the elongated runners have runner widths measured along the lateral axis. The radius of curvature exceeds each of the runner widths.

6. The build-up resistant crop conveyor system of example 1, wherein the elongated runners include: (i) first end portions; (ii) second end portions opposite the first end portions, as taken along longitudinal axes of the elongated runners; and (iii) intermediate portions extending between the first and second end portions, the convex surface regions located on the intermediate portions of the elongated runners.

7. The build-up resistant crop conveyor system of example 6, wherein the belt guide surfaces transition from substantially flat surface geometries to convex surface geometries to when moving from the first end portions to the intermediate portions of the elongated runners.

8. The build-up resistant crop conveyor system of example 7, wherein the belt guide surfaces follow ramped contours when transitioning from substantially flat surface geometries to the convex surface geometries.

9. The build-up resistant crop conveyor system of example 7, wherein the belt guide surfaces further transition from additional substantially flat surface geometries to the convex surface geometries to when moving from the second end portions to the intermediate portions of the elongated runners.

10. The build-up resistant crop conveyor system of example 1, wherein the runner assembly further includes a cross-support member extending across and joined to the elongated runners. The belt guide surface further include non-convex surface regions at locations adjacent the cross-support member.

11. The build-up resistant crop conveyor system of example 1, wherein the elongated runners include front walls on which the belt guide surfaces are located, as well as raised protrusions pressed into the front walls from backsides thereof to define the convex surface regions. The raised protrusions form concavities in the backsides of the front walls.

12. The build-up resistant crop conveyor system of example 11, wherein the elongated runners further include sidewalls integrally joined to opposing longitudinal edges of the front walls and imparting the elongated runners with U-shaped cross-sectional geometries, as viewed along longitudinal axes of the elongated runners.

13. The build-up resistant crop conveyor system of example 1, wherein the convex surface geometries are each define, at least in substantial part, by a first radius of curvature taken in the first section plane. The conveyor belt run includes a plurality of conveyor belts arranged in a side-by-side relationship. Additionally, the plurality of conveyor belts include curved runner-facing surfaces each having a second radius of curvature taken in the first section plane, the second radius of curvature substantially matching the first radius of curvature.

14. The build-up resistant crop conveyor system of example 1, further including a baler gate frame into which the runner assembly is incorporated.

15. In further embodiments, the build-up resistant crop conveyor includes a conveyor belt run extending in a primary direction of belt travel and a first elongated runner adjacent the conveyor belt run. The first elongated runner has a longitudinal axis extending substantially parallel to the primary direction of belt travel. The first elongated runner further includes a first end portion; a second end portion opposite the first end portion, as taken along a longitudinal axis; an intermediate portion between the first and second end portions; a belt guide surface extending from the first end portion, across the intermediate portion, and to the second end portion; and a raised protrusion formed in the intermediate portion and extending toward the conveyor belt run. The raised protrusion is shaped to increase conformity between the belt guide surface and the conveyor belt run to reduce crop build-up on the elongated runner during usage of the build-up resistant crop conveyor system.

CONCLUSION

There has thus been provided crop conveyor systems including elongated runners having uniquely contoured surface geometries, which improve physical conformance with conveyor belt surfaces included in a neighboring belt run. In at least some embodiments, the belt guide surfaces of the elongated runners are imparted with geometries or topologies vary along the length of the runners. In such embodiments, the belt guide surfaces may transition from convex geometries to other non-convex geometries in selected regions, as taken along the runner lengths; e.g., the belt guide surfaces may transition from convex surface geometries to substantially flat surface geometries proximate roller-facing regions of the runners and/or proximate regions of the runners joined to one or more cross-support members. Due to the enhanced resistance to crop material build-up achieved by strategic contouring of the runner belt guide surfaces, low friction operation can be better maintained between the belt run and the runner assembly to prolong belt life, to reduce friction-generated heat, and to otherwise optimize crop conveyor system performance.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A build-up resistant crop conveyor system utilized within an agricultural machine, the build-up resistant crop conveyor system comprising:
a conveyor belt run extending along a primary direction of belt travel; and
a runner assembly adjacent the conveyor belt run, the runner assembly comprising:
elongated runners extending parallel to the primary direction of belt travel and spaced along a lateral axis perpendicular to the primary direction of belt travel, the elongated runners having upper belt guide surfaces forming integral parts of the elongated runners facing and contacting the conveyor belt run, the belt guide surfaces comprising convex surface regions in a first section plane parallel to the lateral axis and perpendicular to the primary direction of belt travel, the convex surface regions increasing conformity between the belt guide surfaces and the conveyor belt run to reduce crop build-up on the elongated runners during usage of the build-up resistant crop conveyor system;

wherein the elongated runners comprise:
first end portions;
second end portions opposite the first end portions, as taken along longitudinal axes of the elongated runners extending along the primary direction of belt travel; and
intermediate portions extending along the longitudinal axes between the first and second end portions, the convex surface regions located on the intermediate portions of the elongated runners.

2. The build-up resistant crop conveyor system of claim 1, further comprising a roller supporting the conveyor belt run and extending parallel to the lateral axis;
wherein the belt guide surfaces further comprise non-convex surface regions adjacent the roller.

3. The build-up resistant crop conveyor system of claim 2, wherein the non-convex surface regions have flat surface geometries in a second section plane parallel to the first section plane.

4. The build-up resistant crop conveyor system of claim 1, wherein the convex surface regions each have a surface geometry defined, at least in part, by a radius of curvature in the first section plane.

5. The build-up resistant crop conveyor system of claim 4, wherein the elongated runners have runner widths measured along the lateral axis; and
wherein the radius of curvature exceeds each of the runner widths.

6. The build-up resistant crop conveyor system of claim 1, wherein the belt guide surfaces transition from flat surface geometries to convex surface geometries when moving from the first end portions to the intermediate portions of the elongated runners.

7. The build-up resistant crop conveyor system of claim 6, wherein the belt guide surfaces follow ramped contours when transitioning from flat surface geometries to the convex surface geometries.

8. The build-up resistant crop conveyor system of claim 6, wherein the belt guide surfaces further transition from additional flat surface geometries to the convex surface geometries when moving from the second end portions to the intermediate portions of the elongated runners.

9. The build-up resistant crop conveyor system of claim 1, wherein the runner assembly further comprises a cross-support member extending across and joined to the elongated runners; and
wherein the belt guide surfaces further comprise non-convex surface regions at locations adjacent the cross-support member.

10. The build-up resistant crop conveyor system of claim 1, wherein the elongated runners comprise:
front walls on which the belt guide surfaces are located; and
raised protrusions pressed into the front walls from backsides thereof to define the convex surface regions, the raised protrusions forming concavities in the backsides of the front walls.

11. The build-up resistant crop conveyor system of claim 10, wherein the elongated runners further comprise sidewalls integrally joined to opposing longitudinal edges of the front walls and imparting the elongated runners with U-shaped cross-sectional geometries, as viewed along longitudinal axes of the elongated runners.

12. The build-up resistant crop conveyor system of claim 1, wherein the convex surface geometries are each defined, at least in part, by a first radius of curvature taken in the first section plane;
wherein the conveyor belt run comprises a plurality of conveyor belts arranged in a side-by-side relationship; and
wherein the plurality of conveyor belts comprise curved runner-facing surfaces each having a second radius of curvature taken in the first section plane, the second radius of curvature matching the first radius of curvature.

13. The build-up resistant crop conveyor system of claim 1, further comprising a baler gate frame into which the runner assembly is incorporated.

14. A build-up resistant crop conveyor system utilized within an agricultural machine, the build-up resistant crop conveyor system comprising:
a conveyor belt run extending in a primary direction of belt travel; and
a first elongated runner adjacent the conveyor belt run and having a longitudinal axis extending parallel to the primary direction of belt travel, the first elongated runner comprising:
a first end portion;
a second end portion opposite the first end portion, as taken along a longitudinal axis of the first elongated runner extending along the primary direction of belt travel;
an intermediate portion extending along the longitudinal axis between the first and second end portions, the convex surface regions located on the intermediate portions of the elongated runners;
a belt guide surface extending from the first end portion, across the intermediate portion, and to the second end portion; and
a raised protrusion formed in the intermediate portion and extending toward and contacting the conveyor belt run, the raised protrusion increasing conformity between the belt guide surface and the conveyor belt run to reduce crop build-up on the elongated runner during usage of the build-up resistant crop conveyor system;
wherein the raised protrusion being an integrally formed upper surface of the intermediate portion of the first elongated runner having a convex surface geometry in a first section plane orthogonal to the longitudinal axis.

15. The build-up resistant crop conveyor system of claim 14, wherein the first end portion has a flat geometry as taken in a second section plane parallel to the first section plane.

16. The build-up resistant crop conveyor system of claim 14, wherein first elongated runner has a wall thickness; and
wherein the raised protrusion has a peak height greater than or equal to at least half the wall thickness.

17. The build-up resistant crop conveyor system of claim 14, wherein the first elongated runners has a runner length measured along the longitudinal axis; and
wherein the raised protrusion extends at least a majority of the runner length.

18. A build-up resistant crop conveyor system, comprising:

a conveyor belt run extending along a primary direction of belt travel, the conveyor belt run comprising:
  a plurality of conveyor belts; and
  runner-facing surfaces provided on the plurality of conveyor belts, the runner-facing surfaces having concave surface geometries principally defined by a radius of belt curvature in a first section plane orthogonal to the primary direction of belt travel; and
elongated runners extending adjacent and parallel to the plurality of conveyor belts, the elongated runners having upper belt guide surfaces as integrally formed parts of the elongated runners, the belt guide surfaces having convex surface regions defined by a radius of runner curvature in the first section plane; the elongated runners comprising:
  first end portions;
  second end portions opposite the first end portions, as taken along longitudinal axes of the elongated runners extending along the primary direction of belt travel; and
  intermediate portions extending along the longitudinal axes between the first and second end portions, the convex surface regions located on the intermediate portions of the elongated runners;
wherein the convex surface regions of the belt guide surfaces are contoured such that radius of runner curvature matches the radius of belt curvature as the conveyor belts contact the belt guide surfaces.

* * * * *

UNITED STATES PATENT AND TRADEMARK OFFICE
CERTIFICATE OF CORRECTION

PATENT NO. : 11,800,833 B2
APPLICATION NO. : 16/527482
DATED : October 31, 2023
INVENTOR(S) : Jacob D. Kappelman It is certified that error appears in the above-identified patent and that said Letters Patent is hereby corrected as shown below:

In the Claims

In Column 19, Line 14, Claim 18, delete "plane;" and insert -- plane, --, therefor.

Signed and Sealed this
Twenty-third Day of January, 2024

*Katherine Kelly Vidal*

Katherine Kelly Vidal
*Director of the United States Patent and Trademark Office*